No. 627,240. Patented June 20, 1899.
S. STECH.
PROPELLING MECHANISM FOR BICYCLES.
(Application filed June 3, 1898.)
(No Model.) 2 Sheets—Sheet 1.
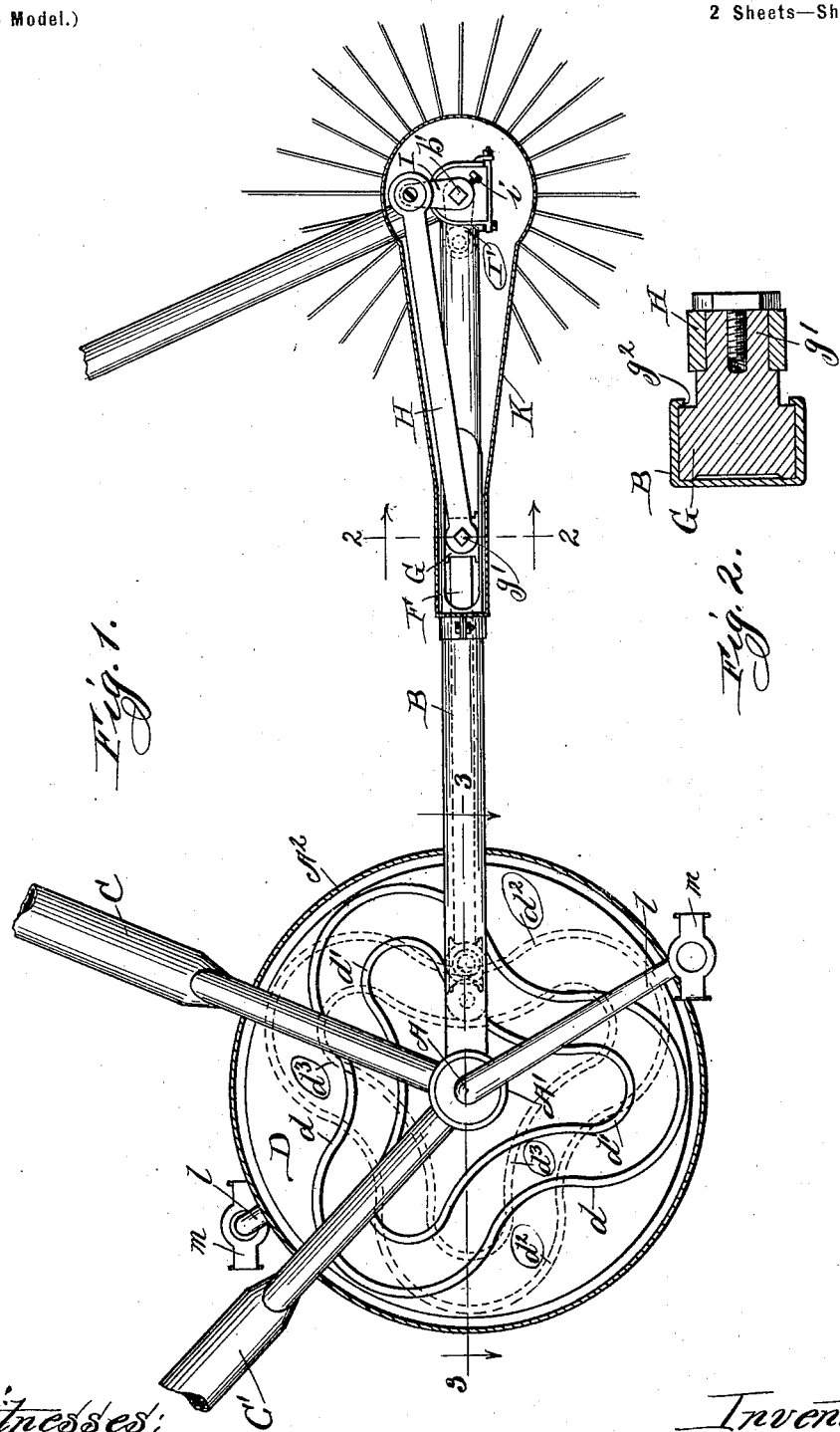

No. 627,240. Patented June 20, 1899.
S. STECH.
PROPELLING MECHANISM FOR BICYCLES.
(Application filed June 3, 1898.)
(No Model.) 2 Sheets—Sheet 2.
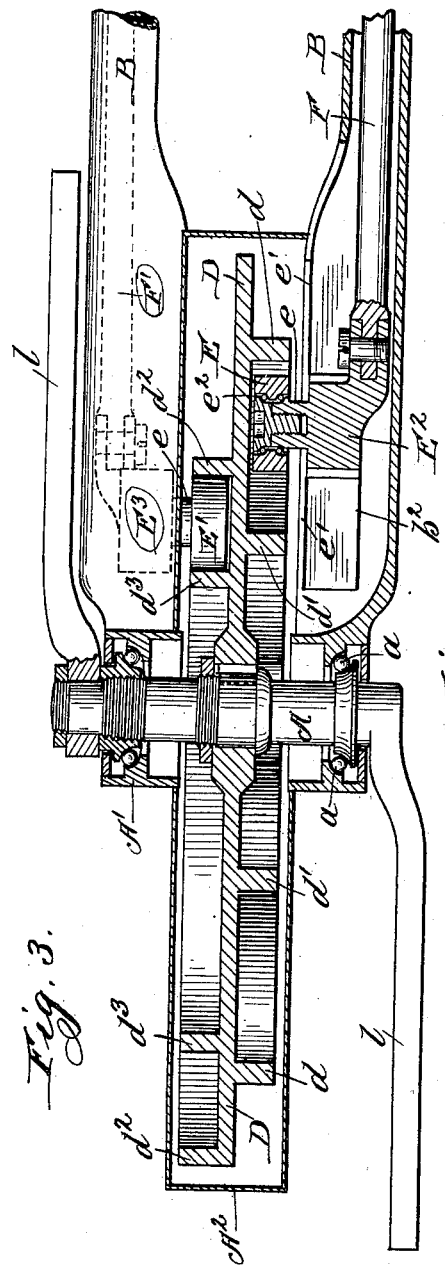
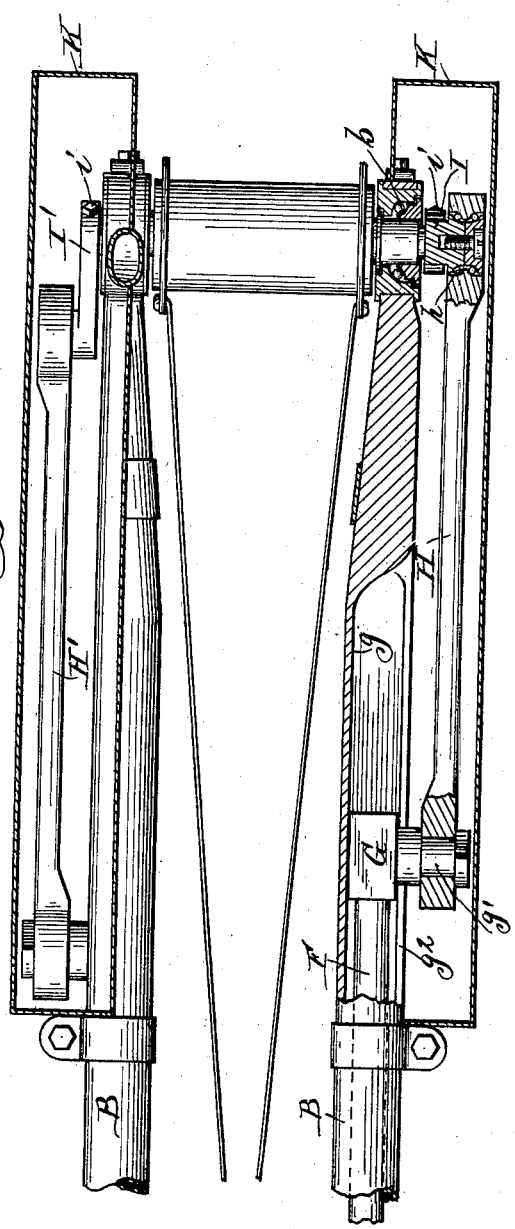
Witnesses:
R. J. Jacker.
E. A. Duggan.
Inventor:
Stephen Stech.
By Chas. C. Tillman, Atty.

UNITED STATES PATENT OFFICE.

STEPHEN STECH, OF BUTTE, MONTANA, ASSIGNOR OF ONE-HALF TO GEORGE W. BROWN, OF SAME PLACE.

PROPELLING MECHANISM FOR BICYCLES.

SPECIFICATION forming part of Letters Patent No. 627,240, dated June 20, 1899.

Application filed June 3, 1898. Serial No. 682,441. (No model.)

*To all whom it may concern:*

Be it known that I, STEPHEN STECH, a citizen of the United States, residing at Butte, in the county of Silver Bow and State of Montana, have invented certain new and useful Improvements in Propelling Mechanism for Bicycles, of which the following is a specification.

This invention relates to improvements in a mechanism to be used for propelling vehicles, and while it is more especially intended to be used for bicycles yet it may with slight and immaterial changes be employed on velocipedes or other vehicles propelled by foot-power; and it consists in certain peculiarities of the construction, novel arrangement, and operation of the various parts thereof, as will be hereinafter more fully set forth and specifically claimed.

The objects of my invention are, first, to provide a propelling mechanism for that class of bicycles known as "chainless" bicycles, and which mechanism shall be simple and inexpensive in construction, strong, durable, and effective in operation; second, such a mechanism in which the cogged and beveled gears employed in the ordinary or general construction of driving-gears for bicycles of the chainless type are dispensed with, and, third, to provide a propelling mechanism in which by reason of the peculiar construction and operation of its parts the dead-centers will be overcome.

In order to enable others skilled in the art to which my invention pertains to make and use the same, I will now proceed to describe it, referring to the accompanying drawings, in which—

Figure 1 is a view in side elevation, partly in section, of a portion of the bicycle-frame, showing my mechanism in position thereon. Fig. 2 is a cross-sectional view, taken on line 2 2 of Fig. 1, looking in the direction indicated by the arrows, showing one of the reciprocating blocks, the guide therefor, and the pitman connecting it with one of the cranks on the axle of the rear wheel. Fig. 3 is an enlarged plan sectional view, partly in elevation, taken on line 3 3 of Fig. 1, looking in the direction of the arrows, showing the crank-axle journaled in the crank-hanger and illustrating the cam disk or wheel mounted on said axle; and Fig. 4 is a plan sectional view, partly in elevation, of a portion of the rear part of the bicycle-frame and a part of the rear wheel, illustrating the means for imparting motion thereto.

Similar letters refer to like parts throughout the different views of the drawings.

A represents a crank-axle which is journaled in a hanger A', secured to the front portion of the tubes B, whose rear ends are provided with ball-bearings $b$ for the axle $b'$ of the rear wheel of the bicycle. Secured to the crank-hanger A' and extending upwardly therefrom is a tubular piece C, on whose upper end may be located a saddle and whose lower portion is forked to stride the cam or driving disk and its casing, as will be presently explained. Extending upwardly and forwardly from the crank-hanger A' is another tubular piece C', whose lower portion is forked to stride the cam-disk and its casing and whose upper portion is connected to the crown-head of the bicycle-frame. The crank-hanger may be provided with ball-bearings $a$ of the ordinary or any preferred construction and preferably has its middle portion provided with an enlarged circular casing $A^2$, within which the cam or driving disk D revolves, which disk is mounted on and keyed or otherwise secured to the crank-axle, as is clearly shown in Fig. 3 of the drawings. On the sides or faces of the disk D are formed or provided flanges $d$, $d'$, $d^2$, and $d^3$ to form cam-grooves or guideways for the reception and operation of the rollers E and E', journaled on the sliding blocks $E^2$ and $E^3$, respectively. The flanges or projections $d$ and $d'$ are formed or secured on one side or face of the disk D and in alinement with one another, so as to furnish a continuous groove having a series of bends or curves alternating inwardly and outwardly, and the flanges or projections $d^2$ and $d^3$ on the other side of the disk D produce a groove or guideway of a similar construction; but it is located on the disk, so as to be out of alinement with the groove produced by the flanges or projections $d$ and $d'$ on the opposite side of the disk.

In the drawings I have shown the cam-grooves produced by the said flanges or projections with three inward and outward curves or bends; yet I do not desire to be limited to such a number, as I may increase or diminish the number of said curves or bends without departing from the spirit of my invention.

The front portions of the tubes B, or that part thereof adjacent to the crank-hanger, are provided with grooves or guideways $b^2$ for the reception and operation of the blocks $E^2$ and $E^3$, each of which is provided with a stub-shaft $e$, extending through slots $e'$ in the adjacent surfaces of the tubes B, which connect the crank-hanger and rear axle, on which the rollers E and E' are journaled, said rollers being preferably provided with ball-bearings $e^2$ and are located in the cam-grooves on the driving or cam disk. Secured to each of the blocks $E^2$ and $E^3$ are rods F and F', the rear end of each of which is formed or provided with a sliding block G, located within suitable guideways $g$ in the tubes or pieces B, and which blocks have on their outer surfaces a stub-shaft $g'$, which extends through slots $g^2$ in the tubes B, and to which stub-shafts are pivotally secured the front ends of the pitmen H and H', the rear ends of which are similarly secured to cranks I and I', respectively, which cranks are rigidly secured by means of set-screws $i$ or otherwise to the axle $b'$ of the rear wheel of the bicycle and at angles with respect to one another. Casings K of suitable sizes and designs are secured to the rear portion of the tubes B, so as to cover the pitmen-rods H and H' and cranks $i$ and $i'$ to protect them from dust and dirt and to prevent them becoming entangled with the garments of the rider. Each of the pitmen may be provided with ball-bearings $h$ in their ends connected to the cranks of the rear axle.

The operation of my device is simple and as follows: By rotating the crank-axle, which is provided, as usual, with cranks $l$ and pedals $m$, the cam or driving disk D will be rotated, and as the rollers E and E' engage the cam-grooves on said disk it is apparent that a reciprocating motion will be given to the rods F and F' and to the pitmen H and H', and through the latter and the cranks I and I' a rotary motion will be imparted to the rear wheel of the bicycle, which motion may be maintained at a greater or less speed by a fast or slow rotation of the cam or driving disk and crank-shaft. When the cam-disk is constructed, as shown in Fig. 1 of the drawings, with grooves having three inward and outward bends or curves, one revolution of said disk will cause three revolutions of the rear wheel of the bicycle, and it is apparent that the revolutions of the bicycle-wheel may be increased or diminished by increasing or diminishing the number of curves or bends in the cam-grooves on the disk.

Having thus fully described my invention, what I claim as new, and desire to secure by Letters-Patent, is—

The combination with a crank-axle, of a disk mounted thereon and having on its sides cam-grooves provided with a plurality of curves, pieces connected at one of their ends to the crank-hanger and at their other ends to the axle of the rear wheel and having guideways and slots in their front and rear portions, sliding blocks located within the front guideways of said pieces, rollers journaled on said blocks and located in the cam-grooves of the disk, rods connected at one of their ends to the sliding blocks and having at their other ends blocks located in the rear guideways, pitmen pivotally secured to the blocks on the rear ends of said rods, cranks fixed on the axle of the rear wheel and pivotally secured to the pitmen, substantially as described.

Signed at Butte, Montana, this 27th day of May, 1898.

STEPHEN STECH.

Witnesses:
 GEO. B. DYGERT,
 MANSEL V. BOYLE.